Jan. 2, 1951     W. C. CHILDRESS ET AL     2,536,536
STRAP STRETCHING MECHANISM
Original Filed Dec. 21, 1939     7 Sheets-Sheet 2
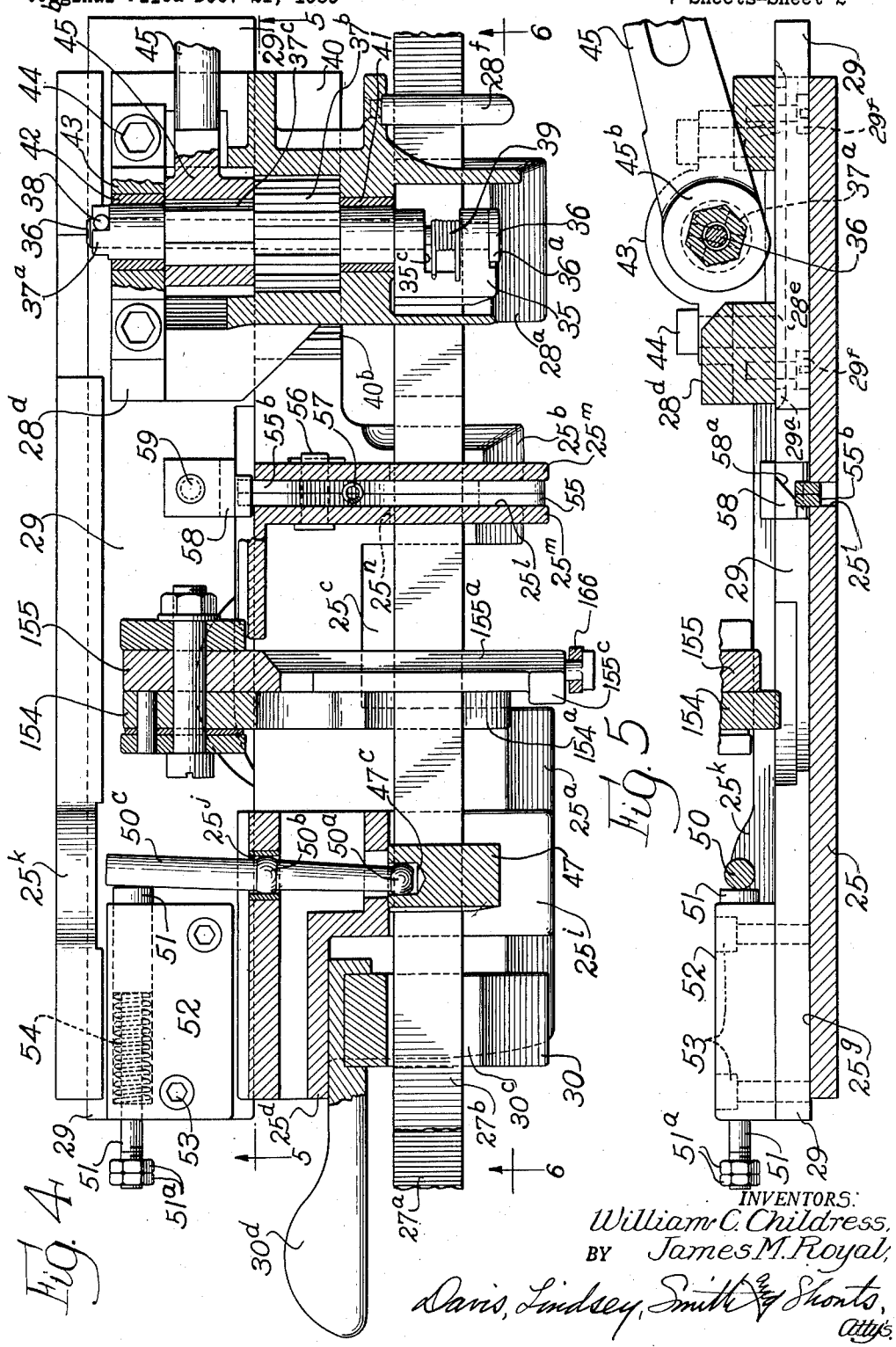
INVENTORS:
William C. Childress,
BY James M. Royal,
Davis, Lindsey, Smith & Shonts,
Attys.

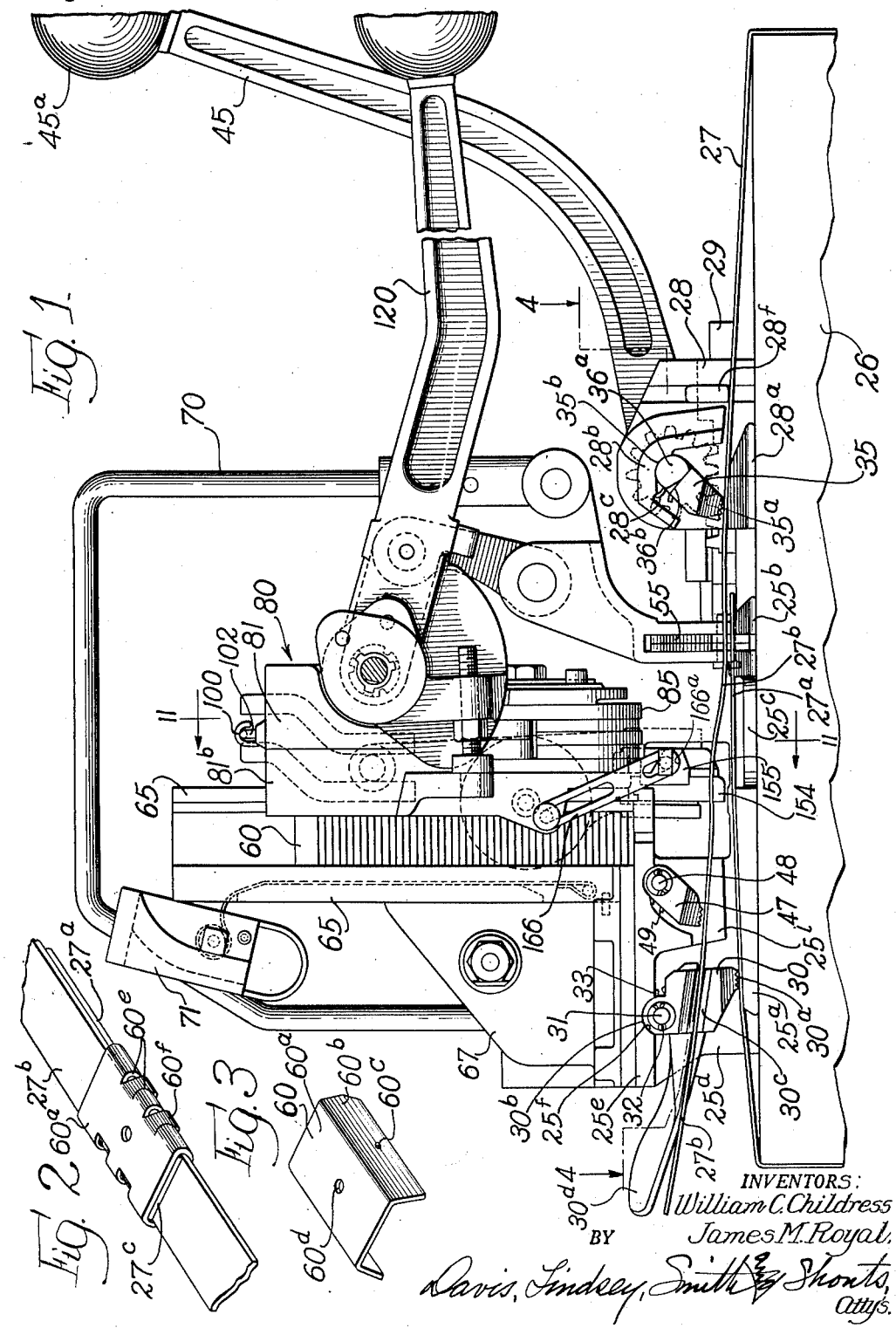

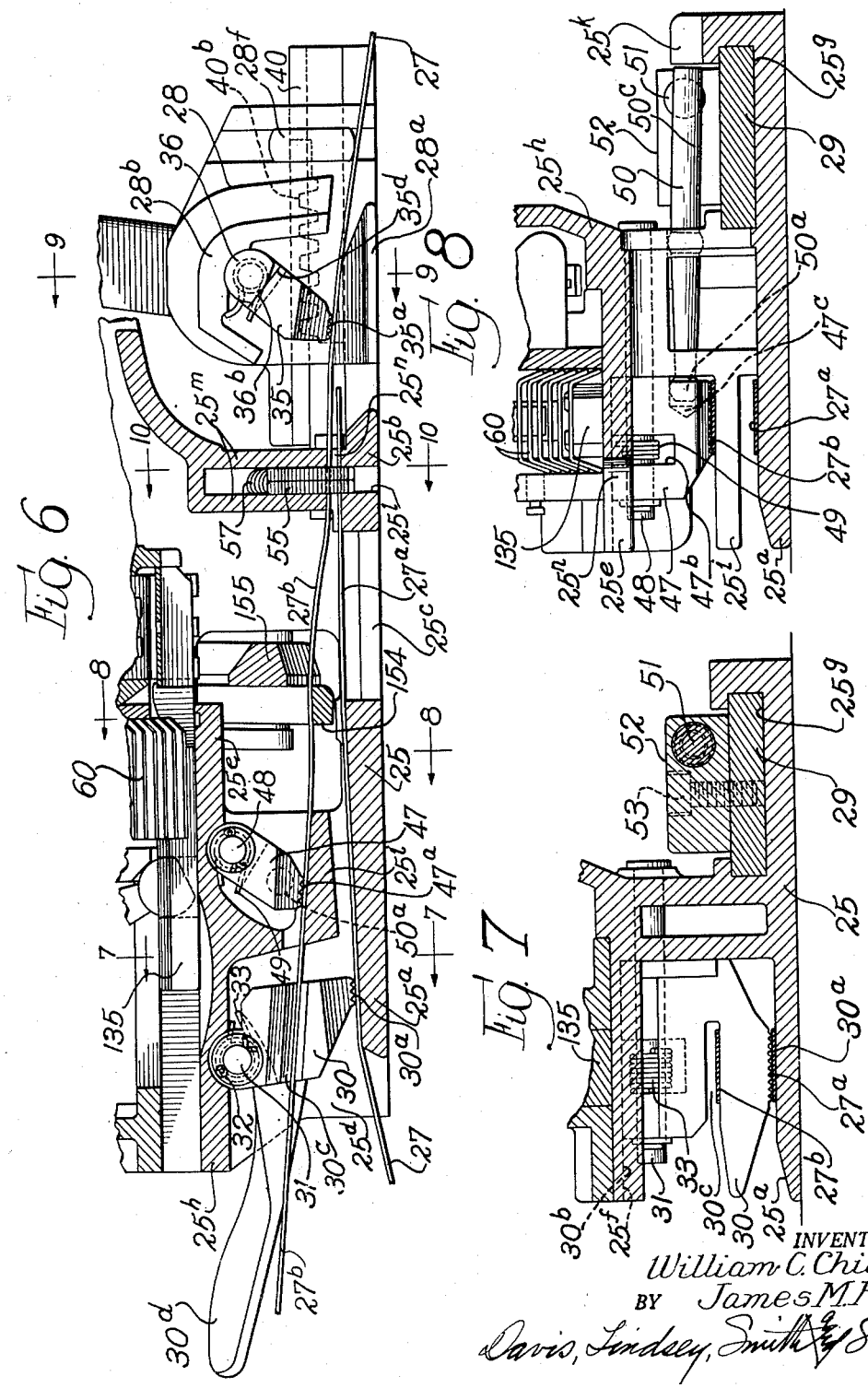

Jan. 2, 1951  W. C. CHILDRESS ET AL  2,536,536
STRAP STRETCHING MECHANISM
Original Filed Dec. 21, 1939  7 Sheets-Sheet 4
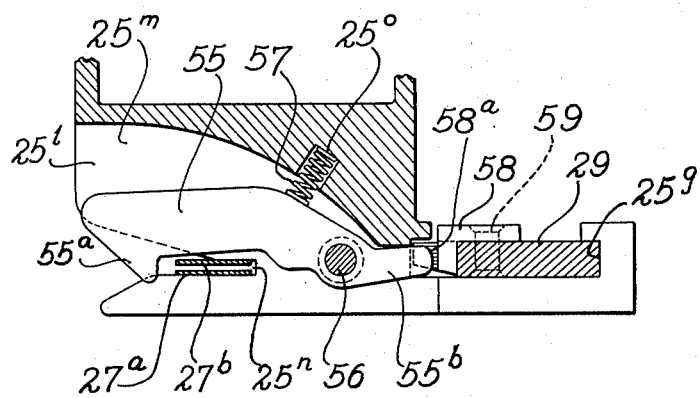
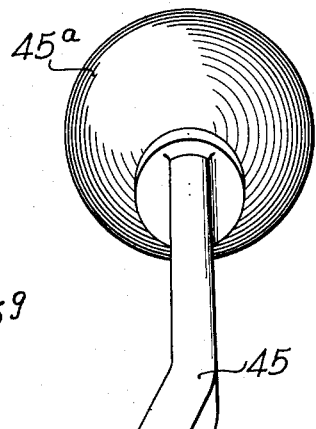
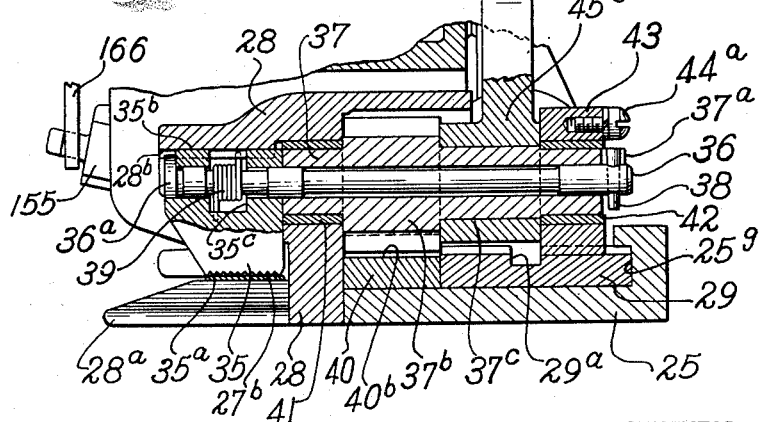
INVENTOR.
William C. Childress.
BY James M. Royal
Davis, Lindsey, Smith & Shonts
Attys

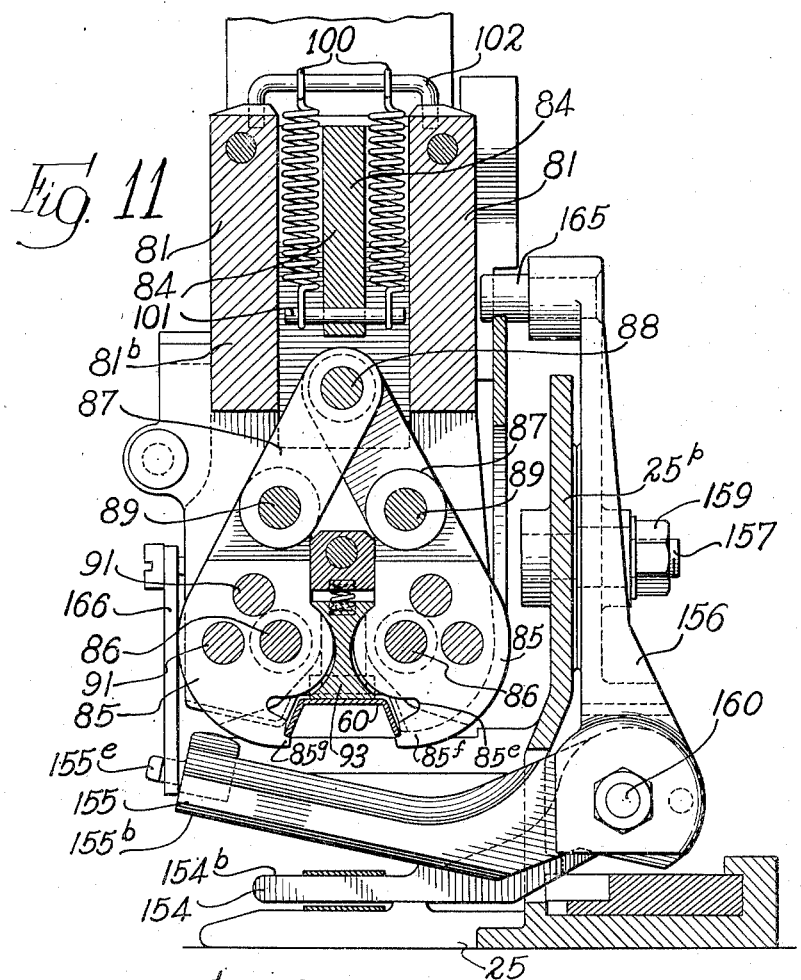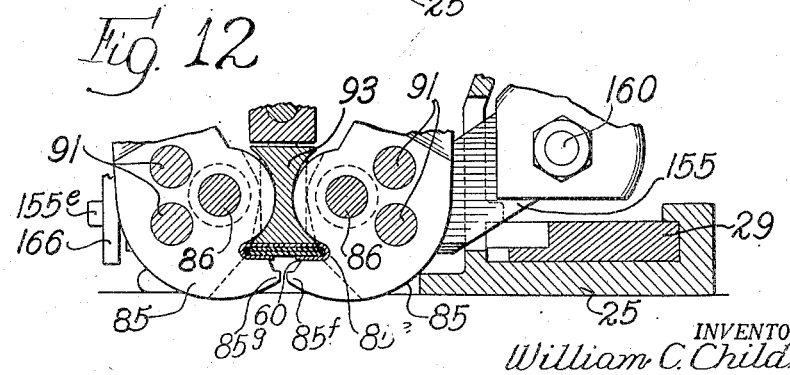

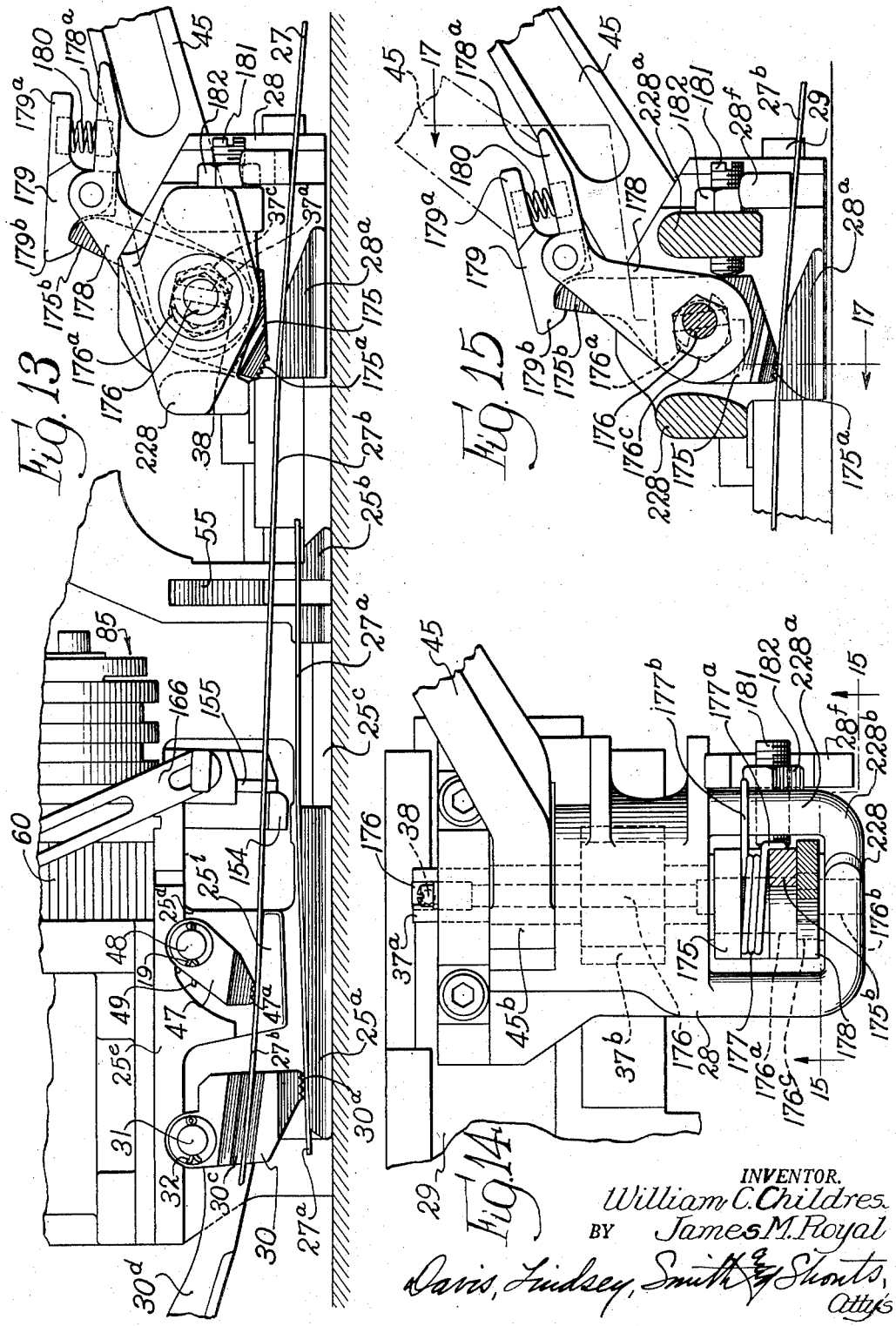

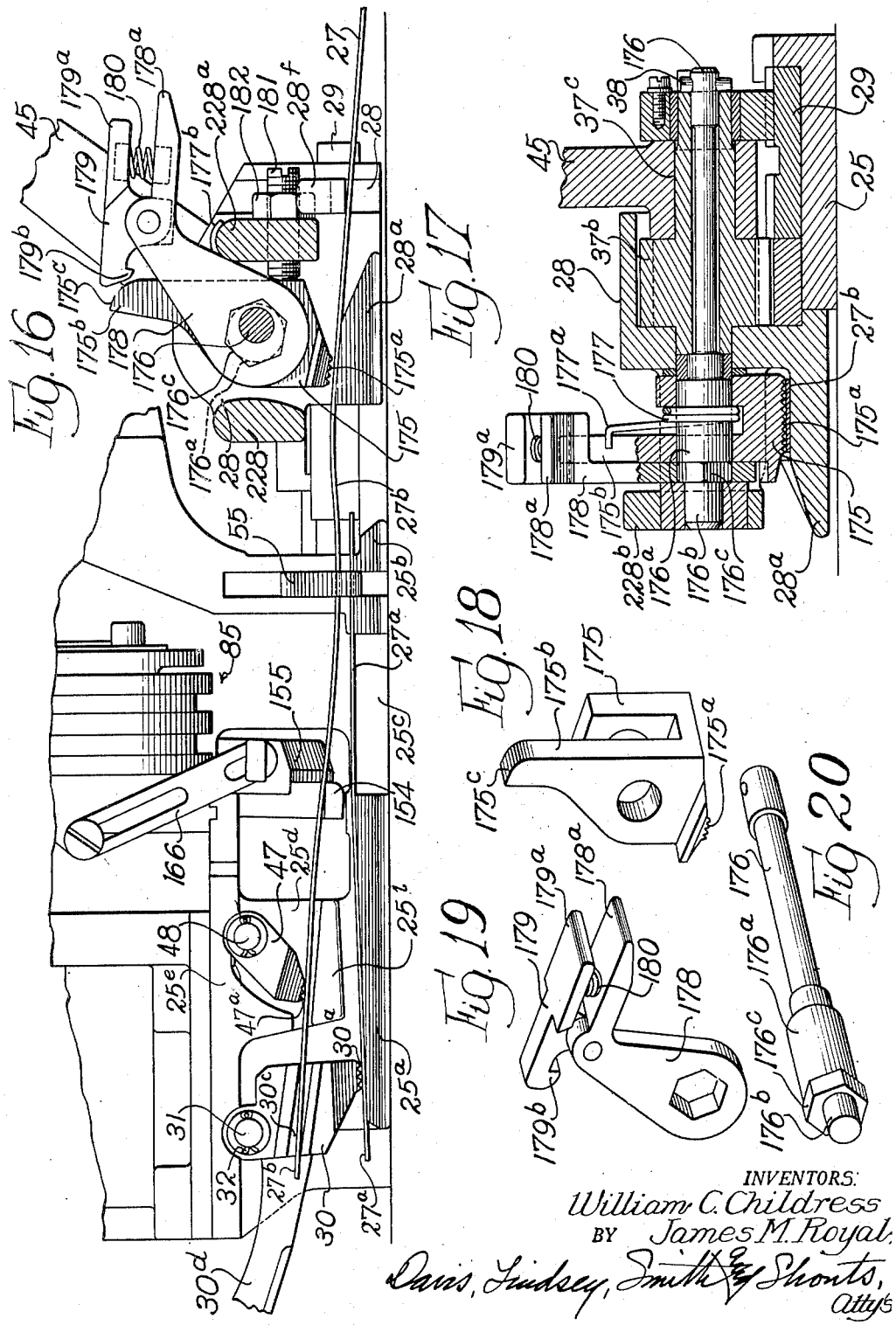

Patented Jan. 2, 1951

2,536,536

UNITED STATES PATENT OFFICE 2,536,536

STRAP STRETCHING MECHANISM

William C. Childress, Oak Park, and James M. Royal, Chicago, Ill., assignors to Acme Steel Company, Chicago, Ill., a corporation of Illinois Original application December 21, 1939, Serial No. 310,276, now Patent No. 2,375,769, dated May 15, 1945. Divided and this application September 21, 1943, Serial No. 503,264

10 Claims. (Cl. 254—79)

This invention relates to improvements in strap stretching apparatus and its purpose is to provide improved means by which a flexible binder, such as a flat or substantially flat flexible steel strap, including strap having a concaved cross section may be drawn taut around a box or package, or about a group of such objects, preliminary to uniting the overlapping strap ends by sealing apparatus or the like. The present application is a division of a copending original application, Serial No. 310,276, filed on December 21, 1939, now Patent Number 2,375,769, granted May 15, 1945, in which there is described and claimed an improved strap sealing apparatus which is combined in one unitary portable tool with the strap stretching apparatus of the present invention. This invention is an improvement upon that described and claimed in United States Letters Patent No. 2,097,444, dated November 2, 1937.

The present invention may be embodied in a combination strap stretching and sealing tool in which opposite end portions of a strap passed around a package are held by relatively movable gripping devices carried by the base plate of the apparatus, which is adapted to seat upon the package, these gripping devices being capable of relative movement by the actuation of a lever for the purpose of drawing the strap taut around the package, after which another lever is operated to cut off the strap from the source of supply, to move a seal into engagement with the overlapping strap ends and then to deform the seal and the strap ends to provide an interlocking joint. The present improvement may also be embodied in a tool which performs the single function of drawing the strap taut around a package and placing its ends in overlapping relationship in readiness to permit the formation of a joint between these ends by a separate tool or apparatus.

The present invention has for its principal object the provision of improved apparatus of the type referred to which may be conveniently and efficiently operated and which is strong and durable so that it may be used with particular advantage in drawing taut metal straps of heavy gauges although capable of other uses. A further object is to provide strap sealing apparatus comprising improved stretching mechanism for drawing a strap taut around a box or package, this stretching mechanism comprising relatively movable gripping devices and actuating mechanism for moving these gripping dogs to draw the strap taut in combination with an additional gripping device adapted to hold the supply portion of the strap between successive operations of the actuating mechanism so that the strap may be drawn taut in successive increments without releasing the strap between successive operations of the actuating mechanism. Another object is to provide improved strap stretching mechanism adapted to draw a strap taut around a package and comprising two relatively movable gripping dogs for holding the strap during the stretching operation and also a third gripping dog for holding the supply end of the strap between successive operations of the stretching mechanism, said stretching mechanism embodying a lever which is connected to release two of said gripping devices from the strap when it is moved to a predetermined position. Another object is to provide strap sealing apparatus comprising a base plate adapted to seat upon the surface of a box or package, said base plate having parts over which the opposite end portions of the strap are adapted to extend in combination with gripping devices mounted over the base plate for cooperating therewith to hold said portions of the strap and a retaining member adapted to prevent the removal of the strap ends laterally from their positions beneath the gripping dogs, said retaining member and at least one of said gripping dogs being automatically removed to inoperative positions by a predetermined operation of mechanism which is provided for effecting relative movement of the gripping dogs for the purpose of drawing the strap taut. Still another object is to provide strap stretching apparatus comprising improved means for mounting and actuating relatively movable gripping dogs by which the opposite end portions of a strap are held. Other objects relate to various features of construction and arrangement which will appear more fully hereinafter.

The nature of the invention will be understood from the following specification taken with the accompanying drawings in which one embodiment of the invention and a modification of a part thereof are illustrated. In the drawings, Figure 1 shows a front elevation of one form of strap stretching and sealing apparatus embodying the present invention, the apparatus being positioned upon the upper surface of a box or package about which a flat flexible metallic binder has been passed;

Fig. 2 is a perspective view of overlapping strap ends which are united by one form of interlocking joint adapted to be formed by the apparatus illustrated in Fig. 1, the upper end of the strap being shown cut off at proximity to one end of the seal;

Fig. 3 is a perspective view of one form of channel-shaped metal seal adapted to be used with the apparatus illustrated in Fig. 1;

Fig. 4 shows an irregular horizontal section taken on the line 4—4 of Fig. 1;

Fig. 5 shows a partial vertical section taken on the line 5—5 of Fig. 4;

Fig. 6 shows an enlarged vertical section taken on the line 6—6 of Fig. 4, illustrating the sealing head in its extreme elevated position in which it is adapted to receive a seal from the lower end of the magazine.

Fig. 7 shows a vertical section taken on the line 7—7 of Fig. 6;

Fig. 8 shows a vertical section taken on the line 8—8 of Fig. 6;

Fig. 9 shows a vertical section taken on the line 9—9 of Fig. 6;

Fig. 10 shows a vertical section taken on the line 10—10 of Fig. 6;

Fig. 11 shows a vertical section taken on the line 11—11 of Fig. 1, illustrating the sealing jaws and the movable cutting blade in their elevated positions;

Fig. 12 is a partial sectional view similar to that of Fig. 11 showing the relative positions of parts after the sealing head has been lowered to cause a seal to embrace the overlapping strap ends and after the jaws have been actuated to bend the seal about the strap ends and to deform the strap and seal to provide an interlocking joint;

Fig. 13 is a partial front elevation, similar to that of Fig. 1, showing a modified construction of the movable gripping dog which, in this form, is mounted upon an eccentric;

Fig. 14 is a top plan view of the modified construction shown in Fig. 13;

Fig. 15 is a vertical section taken on the line 15—15 of Fig. 14, showing a front elevation of the gripping dog and the operating lever when the dog is in engagement with the strap;

Fig. 16 is a front elevation, similar to Fig. 1, with parts in vertical section, when the apparatus embodies the modified form of gripping dog shown in Fig. 16, illustrating the relative positions of the parts when the movable gripping dog and the holding dog are both out of engagement with the strap;

Fig. 17 is an irregular vertical section taken on the line 17—17 of Fig. 15;

Fig. 18 is a perspective view of the movable gripping dog shown in Fig. 13;

Fig. 19 is a perspective view of the dog operating lever and latch shown in Figs. 13 and 15;

Fig. 20 is a perspective view of the pin on which the movable gripping dog shown in Fig. 13 is eccentrically mounted.

The invention is illustrated in the drawings as being embodied in a combination strap stretching and sealing device which performs the function of drawing the strap taut around a box or package and also the operation of cutting off the strap from the source of supply and applying a seal to the overlapping strap ends to form an interlocking joint. As illustrated in the drawings, the invention comprises an integral frame having a base plate 25 adapted to seat upon the surface of a box or package 26 about which a flat flexible steel strap 27 is passed. The base plate 25 is provided with two forwardly projecting flanges 25ª and 25ᵇ over which the free end portion 27ª of the strap extends, the strap bridging the gap 25ᶜ between these flanges which is the region in which the interlocking joint is subsequently formed. After passing around the box or package 26, the supply end portion 27ᵇ of the strap is carried over another flange 28ª which also rests upon the surface of the box or package 26 and which projects forwardly from a block 28 secured upon a sliding bar 29 arranged to move on the base plate parallel to the strap. The free end portion 27ª of the strap is adapted to be secured upon the base flange 25ª by a gripping dog 30 which is pivotally mounted on a pin 31 projecting in a forward direction from the upwardly extending web portion 25ᵈ of the base plate. The gripping dog is retained in position on the pin 31 by a cotter pin 32 which extends transversely through an aperture on the outer end of the pin 31 and the gripping dog is normally moved into engagement with the end portion 27ª of the strap by a coil spring 33 which is mounted on the pin 31 in a recess in the upper side of the gripping dog with one extremity bearing on the dog and the other extremity bearing against the horizontal frame portion 25ᵉ which is carried by the vertical web portion 25ᵈ of the base plate. The gripping dog 30 is provided on its lower edge with a serrated surface 30ª adapted to engage the upper side of the end portion 27ª of the strap, this serrated portion being offset toward the right, as viewed in Fig. 1, from a vertical plane containing the axis of the pivot pin 31 so that a pull upon the strap toward the left, as viewed in Fig. 1, will tend to tighten the grip of the dog 30 upon the strap, while a pull upon the strap in the opposite direction will tend to release it from its position beneath the dog. The gripping dog is provided between the gripping surface 30ª and the pin 31 with an inwardly extending inclined slot 30ᶜ through which the supply portion 27ᵇ of the strap extends in passing from a reel or other source of supply. The gripping dog 30 has a handle 30ᵈ fitting over the inner end of the dog, as shown in Fig. 4, and projecting end-wise beyond the base plate so that it may be engaged by the fingers of the operator for raising the gripping dog out of contact with the strap end 27ª against the compression of the spring 33.

The supply portion 27ᵇ of the strap is adapted to be engaged on its upper side by a gripping dog 35 which is mounted on the block 28 by which the flange 28ª is carried. This gripping dog is pivotally mounted upon a pin 36 which fits within the bore of a hollow shaft 37 by which the sliding bar 29, previously referred to, is actuated. As shown in Fig. 4, the pin 36 has a head 36ª which fits against the outer face of the gripping dog 35, while the other end thereof is engaged by a transverse pin 38 which extends between two diametrically opposed lugs 37ª projecting endwise from the extremity of the hollow shaft 37. The spaces between the lugs 37ª are such that a considerable angular movement of the shaft 37 about the pin 36 is permitted without causing the transverse pin 38 to be engaged by the lugs 37ª, as shown in Fig. 5. The gripping dog 35 is inclined downwardly and toward the left, as viewed in Fig. 1, and the lower end thereof is provided with a serrated surface 35ª adapted to engage the upper surface of the strap 27ᵇ. Due to this inclination of the gripping dog, a movement of the gripping dog and of the block 28 in a direction tending to tighten the strap 27 about the box or package, causes the gripping dog to increase its grip upon the strap, while a movement of the block 28 in the reverse direction tends to release the strap from the gripping dog. A curved flange 28$^b$ is formed integrally with the block 28 and overlies the gripping dog 35, thus providing a curved bearing surface for the curved upper extremity 35$^b$ of the dog. As shown particularly in Fig. 4, the gripping dog is provided between its front and rear edges with a transverse slot 35$^c$ adapted to receive a coil spring 39 which is mounted around the pin 36 with one of its extremities engaging the wall of the slot 35$^c$ and with the other extremity engaging a shoulder 28$^c$ formed on the flange 28$^b$ of the block 28 so that the spring tends normally to move the gripping dog into engagement with the strap. The gripping dog is notched out on its front side to provide a flat transverse shoulder 35$^d$ which is positioned opposite to the flat face 36$^b$ which is formed on one side of the head 36$^a$ of the pin on which the gripping dog is mounted as shown in Fig. 1. The head 36$^a$ of the pin is set into this notch and the shoulder 35$^d$ is spaced slightly from the flat face 36$^b$ so that a limited relative angular movement of the gripping dog with respect to the pin 36 is permitted.

Referring now to the means for effecting relative movement of the gripping dogs 30 and 35, the block 28 which carries the gripping dog 35 is provided with a horizontally extending flange or plate 28$^d$ which seats upon the sliding bar 29, as shown particularly in Figs. 4 and 5. The plate or flange 28$^d$ has a longitudinally extending rib or key 28$^e$ formed on its under side to fit within a longitudinal keyway 29$^a$ which is formed in the sliding bar, and the plate or flange 28$^d$ is secured to the bar by screws 29$^f$ which extend upwardly from the bar through apertures in the plate as shown by dotted lines in Fig. 5. In this way, the block 28 has a rigid connection with the sliding bar 29 which, in turn, is mounted to slide longitudinally of the base plate 25 in an undercut guideway 25$^g$ which is provided partially by flanges formed integrally with the base plate and partially by a block 40 which is secured to the base plate and has a flange overlying the upper edge of the sliding bar as shown by dotted lines in Fig. 6. The block 28 is notched out to receive the block 40 and is adapted to move over this block 40 when the sliding bar 29 is reciprocated. The block 28 is further provided with a forwardly projecting arm 28$^f$ located to the right of the flange 28$^a$, as viewed in Fig. 1, and at a higher level so that it overlies the strap and prevents it from swinging upwardly away from the flange 28$^a$.

The reciprocation of the sliding bar 29 is effected through the medium of a pinion 37$^b$ which is formed integrally with the hollow shaft 37, as shown in Figs. 4 and 9. This pinion meshes with rack teeth 40$^b$ which are formed on the block 40, previously referred to, so that when the shaft 37 is rotated the block 28 and the bar 29 are moved longitudinally of the apparatus, that is, parallel to the strap 27. The shaft 37 is journaled at one end in a bushing 41 which is mounted in an aperture formed in the block 28 and the other end thereof is mounted in a bushing 42 which is mounted in a bearing block 43 secured to the plate 28$^d$ of the block 28 by means of socket screws 44. A screw 44$^a$ engages the block 43 to prevent the removal of the pin 38, as shown in Fig. 9, and the flange of the base plate which overlies the rear edge of the bar 29 is notched out to permit the block 43 to be inserted axially over the end of the shaft 37 and the bushing 41.

The lugs 37$^a$ on the shaft, which were previously referred to, project beyond the bearing block 43, as shown in Fig. 4. The shaft 37 is rotated in these bearings by the stretching lever 45 which is provided at its outer end with a spherical handle portion 45$^a$ and which is provided at its inner end with a hub portion 45$^b$ having a central bore of rectangular cross section which is fitted by the correspondingly shaped portion 37$^c$ of the shaft, thus providing a driving connection between the lever and the shaft so that when the shaft is oscillated in a plane extending parallel to the strap 27, the shaft 37 is moved angularly about the pin 36 and the bar 29 is caused to move longitudinally on the base plate. As shown in Fig. 9, the portions of the pin 36 which are engaged by the spring 39 and which lie within the portions 37$^b$ and 37$^c$ of the shaft are reduced in diameter, thus limiting the frictional resistance to the turning of the shaft about the pin on which the gripping dog is mounted. When the lever 45 is moved toward the left from the position shown in Fig. 1, the bar 29 moves in the same direction, thus causing a movement of the gripping dog 35 toward the gripping dog 30, with a resulting stretching of the strap 27 around the box or package 26. Inasmuch as the gripping dog 35 tends to release itself from the strap upon movement of the block 28 toward the right, as shown in Fig. 1, it will be apparent that the lever 45 may be reciprocated any number of times with corresponding reciprocations of the gripping dog 35 and the alternate gripping and releasing of the strap by this dog so that the strap 27 may be drawn taut around the package in successive increments until the desired degree of tautness is reached. An additional gripping dog 47 is provided, as hereinafter described, for holding the strap 27 between successive operations of the lever 45. The transverse pin 38 in the end of the pin 36 on which the gripping dog 35 is mounted is so positioned with respect to the lugs 37$^a$ extending endwise from the shaft 37 that, as the lever 45 approaches the extreme right-hand position shown in Fig. 1, these lugs engage the pin 38 and rotate the pin 36 with the shaft 37, with the result that the head 36$^a$ of the pin 36, engaging the shoulder 35$^d$ on the gripping dog, causes the gripping dog to be lifted out of engagement with the strap portion 27$^b$ against the tension of the coil spring 39, thus automatically releasing the strap from the gripping dog upon an extreme movement of the lever 45 so that the strap may be passed from its position beneath the gripping dog after it has been drawn taut.

In addition to the gripping dogs 30 and 35, the apparatus of the present invention comprises a third gripping dog 47 which is pivotally mounted upon the outer end of a pin 48, as shown particularly in Figs. 1 and 6. The pin 48 is secured in the upwardly extending frame portion 25$^h$ which is formed integrally with the base plate 25 and the lower end of this gripping dog is provided with a serrated surface 47$^a$ which is adapted to coact with that portion of the upper side of the strap portion 27$^b$ which rests upon a flange 25$^i$ formed integrally with the flange portion 25$^h$ and extending in a forward direction over the flange 25$^a$ and above the strap end 27$^a$, as shown in Fig. 6. The gripping dog 47 is inclined downwardly and toward the left, as viewed in Figs. 1 and 6, so that a movement of the supply portion 27$^b$ of the strap toward the right, as viewed in these figures, causes this dog to increase its grip upon the strap while, upon movement of the strap in the other direction, the gripping dog 47 will tend to release its grip upon the strap so that the strap may slide freely beneath it. The gripping dog 47 is normally moved into engagement with the strap portion $27^b$ above the flange $25^i$ by a coil spring 49 which is mounted around the pin 48 within a notch $47^b$ formed in the upper side of the gripping dog, as illustrated in Fig. 8. One end of this spring engages the flange $25^e$ of the base plate and the other end engages the bottom of the notch $47^b$, as shown in Fig. 6, so that the spring is normally moved toward the flange $25^i$. This gripping dog 47 is capable of being moved out of engagement with the strap, simultaneously with the release of the gripping dog 35, upon movement of the stretching lever 45 to the extreme right-hand position, shown in Fig. 1, this release of the gripping dog being effected by a pin or lever 50, shown particularly in Fig. 8. This lever is provided at its forward end with a spherical extremity $50^a$ which is adapted to rock within a socket $47^c$ formed in the rear side of the gripping dog near its lower edge and, at an intermediate point, the pin or lever 50 is provided with a rounded bearing portion $50^b$ which is adapted to rock within an aperture $25_j$ formed in the upwardly extending frame portion $25^h$ of the base plate. The rear portion $50^c$ of the pin or lever 50 projects over the sliding bar 29, as shown in Fig. 8, and when the sliding bar 29 reaches a predetermined position, this portion of the lever 50 is adapted to be engaged by an actuating pin 51 which is resiliently mounted in a recess in a bearing block 52 secured to the upper side of the sliding bar 29 by means of socket screws 53. A coil spring 54 surrounds the stem of the pin 51 within the block and this stem, extending through an opening at the end of the recess, is engaged by lock nuts $51^a$. The bearing pin 50 is retained in its position engaging the socket in the gripping dog 47 and the bearing $25_j$ in the frame structure by a flange $25^k$ which extends upwardly from the flange which overhangs the rear edge of the bar 29. When the gripping dog 35 is moved out of engagement with the strap by swinging the stretching lever 45 to its extreme right-hand position, as viewed in Fig. 1, the gripping dog 47 is simultaneously moved out of engagement with the portion $27^b$ of the strap by the engagement of the pin 51 with the pin or lever 50. The gripping dog 47 may thus be elevated to permit the removal of the supply end of the strap after the part previously passed around the box or package has been cut off by the operation of the cutting mechanism hereinafter described, in order that the supply end may be placed beneath the gripping dog 30 in readiness for strapping another box or package. The spring 54 causes the plunger 51 to project normally a considerable distance from the right end of the block 52 and is of sufficient strength to cause the pin 50 to operate the gripping dog 47 except when the teeth of the dog are biting into a strap which is under tension when the dog 47 is engaging a strap under tension, and also when the dog has been elevated by the first engagement of the pin 51 with the pin 50, the spring 54 permits a continued movement of the bar 29 for effecting a further elevation of the dog 35. During the operation of drawing a strap taut, the gripping dog 47 serves as a take-up device for holding the strap between successive stretching operations of the reciprocating gripping dog 35. Upon each movement of the dog 35 toward the left, as viewed in Fig. 1, the strap, being relatively stiff, is adapted to slide beneath the gripping dog 47. During the operation of drawing a strap taut, the lever 45 is not moved to the extreme position shown in Fig. 1 where it causes both of the gripping dogs 35 and 47 to release the strap.

The apparatus is provided with means for holding the strap ends in their proper overlapping relationship while the strap is being drawn taut around the package. This retaining means is shown particularly in Figs. 1, 4, 6 and 10 and comprises a hook member 55 which is pivotally mounted on a pin 56 secured in the walls of a slot $25^l$ formed in a vertical flange or web $25^m$ of the base plate which extends upwardly from and in spaced relation to the flange $25^b$, previously referred to, there being a rectangular notch $25^n$ between these flanges, as shown in Fig. 10, which receives the inner edges of the overlapping portions $27^a$ and $27^b$ of the strap. The lower edge of the flange $25^m$ is inclined downwardly and inwardly to facilitate the insertion of the strap ends to their proper positions. When thus inserted, the downwardly extending projection $55^a$ at the end of the retaining member is adapted to prevent withdrawal of the strap ends, the member 55 being normally forced downwardly to the strap retaining position shown in Fig. 10, by means of a coil spring 57 which is mounted in a recess $25^o$ formed in the flange $25^m$ and which bears against the upper side of the member 55. The member 55 is provided rearwardly of the pivot pin 56 with a pin $55^b$ which projects into the path of a cam 58 secured by a rivet 59 on the sliding bar 29. As shown in Figs. 5 and 10, the cam 58 is provided with an inclined surface $58^a$ which is adapted to engage and depress the arm $55^b$ of the retaining member, thus elevating the body portion of the retaining member against the compression of the spring 57 until it is in such a position that the overlying strap ends may be freely removed from their positions above the flange $25^b$. The cam 58 is preferably so located on the sliding bar 29 that the elevation of the retaining member 55 is effected simultaneously with the elevation of the gripping dogs 35 and 47.

The mechanism for cutting off the strap from the source of supply and for applying a seal to the overlapping strap ends is claimed in said original copending application and will be only briefly referred to here for the purpose of explaining the surroundings in which the strap stretching mechanism operates. The seal employed with the apparatus is preferably the channel-shaped metal body 60, shown in Fig. 3, which comprises a back wall $60^a$ and side walls $60^b$ which diverge from the back wall and which are preferably provided midway between their ends with punched projections $60^c$ adapted to provide point-to-point contacts between the side walls of adjacent seals when a plurality of seals are arranged in nested relationship in a stack. The back walls of the seal are preferably provided with apertures $60^d$ so that a stack of seals may be temporarily secured together by a piece of wire or the like inserted through the registering apertures. After the stack of seals is placed in the magazine of the sealing apparatus, the wire is withdrawn and the seals are then adapted to be fed in succession from the bottom of the stack to the jaws of the sealing mechanism by which they are applied to the overlapping ends of the strap which has been drawn taut by the strap stretching mechanism of the present invention.

This form of seal and the resulting package are described and claimed in Letters Patent Nos. 2,062,098 and 2,062,099, granted on November 24, 1936.

When a seal of the type illustrated in Fig. 3 is applied to overlapping strap ends by apparatus of the present invention, the back wall 60ª overlies the supply portion 27ᵇ of the strap and the jaws of the sealing apparatus are adapted to bend the side walls 60ᵇ downwardly and inwardly so that they underlie and contact with the lower end portion 27ª of the strap. The supply portion 27ᵇ of the strap is cut off from the source of supply in such a manner that the transverse cut end 27ᶜ is located in close proximity to and preferably in substantial alignment with one end of the back wall 60ª of the seal. The final act of the sealing operation effected by the sealing device is that of shearing the lateral edges of the strap ends and the seal along the parallel lines 60ᵉ, as shown in Fig. 2, thus forming cuts which extend through the margins of the seal and through the marginal portions of the strap ends. The cuts are arranged in pairs and the jaws are adapted to deflect the metal between the cuts of each pair downwardly to form angularly disposed lugs 60ᶠ, thus providing a series of abutting shoulders between the seal and the strap ends which prevent relative longitudinal movement of the strap ends. The seals 60 are preferably formed of steel or other metal which is comparatively stiff and rigid but sufficiently ductile to permit them to be bent about the strap ends and to retain their form after being bent.

The seals are supplied to the sealing head of the apparatus from a seal storage magazine 65 which is mounted on the base plate 25, as shown in Figs. 1 and 8, and this magazine extends upwardly at the side of a housing 67 which contains mechanism by which the seals are fed from the magazine to the sealing head hereinafter referred to. A handle 70 is secured to the frame or base plate 25 to permit the entire apparatus to be moved about. The seals are fed downwardly in the magazine by a spring actuated member 71 which is adapted to move downwardly in the magazine as the seals are withdrawn from the lower end thereof.

The movable head 80 which receives the seals from the magazine 65 and applies them to the overlapping strap ends comprises a hollow frame or housing 81, shown in Fig. 11, which is mounted to slide vertically toward and from those portions of the overlapping strap ends which extend across the gap 25ᶜ between the flanges 25ª and 25ᵇ of the base plate. A flange 84 is mounted to move vertically in the frame 81 and is arranged to actuate the sealing jaws 85 which are shown particularly in Figs. 11 and 12. These jaws are pivotally mounted on pins 86 and they are adapted to be moved about their pivots by a pair of links 87 which are pivotally connected to the jaws by the pins 89 and pivotally connected to each other and to the plunger 84 by the pin 88 upon vertical reciprocation of the plunger 84. It will be apparent that the jaws 85 may be opened to receive a seal 60 between their lower hooked extremities or closed upon each other for the purpose of applying the seal to the strap ends.

Each jaw member 85 is made up of bending and cutting dies which are arranged alternately and which are so formed that when the jaws close upon each other the bending dies first bend the side walls of the seal about the overlapping strap ends, after which the cutting dies shear the edges of the seal and the strap ends to form the interlocking joint above referred to. In order to hold the seal in the jaws when it is first positioned therein and during the application of the seal to the strap ends, a supporting saddle or pressure member 93 is mounted between the jaws and arranged to engage the back wall of the seal so that the edges of the side walls of the seal are retained in contact with the extremities 85ᵍ of the jaws, as shown in Fig. 11.

The downward movement of the plunger 84 is opposed by two coil springs 100 which are secured at their lower ends to a transverse pin 101 extending through the lower part of the central web of the plunger, as shown in Fig. 11, and which have their upper ends attached to a cross bar 102 carried by the frame 81. After the plunger 84 has been moved downwardly within the frame 81 to effect a closing of the jaws 85 upon the seal, the extended springs will return the plunger to its upper position with a resulting separation of the lower portions of the jaws and this action of the springs is supplemented by the positive operating mechanism by which the plunger 84 is operated. This operating mechanism includes a lever 120 which is shown in its retracted position in Fig. 1 corresponding to the elevated position of the head 80 in which position the jaws 85 are adapted to receive between them a seal fed thereto from the magazine 65. When the lever 120 is swung upwardly and toward the left from the position shown in Fig. 1, the first effect of this operation is to cause the head 80 to be lowered bodily to position the seal 60 carried by the jaws upon the overlapping strap ends and, upon further movement of the lever 120 in the same direction, it actuates certain mechanism which moves the plunger 84 downwardly within the frame 81 so that the jaws are closed upon each other and caused to assume the final position illustrated in Fig. 12. Upon reverse movement of the lever 120, the jaws 85 are first opened to release the seal and the enclosed strap ends and the head 80 is then elevated to the normal position shown in Figs. 1 and 11 in readiness to receive another seal from the magazine. When the sealing head is in this upper position, it is adapted to receive a seal which is automatically fed to the jaws by a plunger 135, shown in Fig. 6, which is mounted for sliding movement in the frame 67 and which is controlled in its operation by the movements of the sealing head.

In addition to controlling the actuation of the seal feeding mechanism, the movable head 80 also serves to control the actuation of the mechanism by which the supply portion of the strap is cut off after the strap has been drawn taut and when this cutting operation takes place the two ends of the strap are placed in proximity to each other in readiness to receive the seal. This cutting mechanism, which is illustrated in Figs. 1, 4, 6, 11 and 13, comprises a shearing blade 154, which is stationary during the cutting operation, and a relatively movable blade 155, both of which are carried by a lever 156 which is pivoted on a stud 157 mounted in the upright portion 25ᵖ of the frame, as shown particularly in Fig. 11. The two blades are attached to the lever 156 by a bolt 160 and the blade 155 is adapted to have pivotal movement about this bolt during the operation of shearing the supply portion of the strap which is positioned over the blade 154. This blade 154 is positioned slightly above the base flange 25ª of the frame to permit the end portion 27ª of the strap to be passed beneath it and its cutting edge 154ᵇ is adapted to cooperate with a similar cutting edge 155ᵇ formed on the pivoted shearing blade to effect cutting of the strap. When the head 80 is elevated, the shearing blades occupy a position directly beneath the head in order that the strap may be cut off in proximity to the position to be occupied by the end of the seal subsequently applied to the overlapping strap ends and, to permit the lowering of the head during the sealing operation, the lever 156 is swung about the bolt 157 through the engagement of a pin 165 with a cam slot formed between the side plates and the head 81, as illustrated in Figs. 1 and 11. As the head approaches its lower condition, the pin 165 engages an inclined portion of the cam slot which causes the shearing blades to be moved out of the path of the head and, during the final movement of the head, the pin 165 travels in the vertical portion of the cam slot. Upon reverse movement of the head, a reverse movement of the shearing blades takes place and the movable shearing blade 155 is elevated through the operation of a link 166 which connects the head with the forward end of this blade. During the downward movement of the head 80 the slot 166ᵃ in the link 166 allows the side plate 81ᵇ of the head to move downwardly to a sufficient extent to engage the projection 155ᶜ on the upper shearing blade, thereby causing a shearing movement of that blade to cut off the strap. In this way, the shearing mechanism is automatically operated to cut off the supply portion of the strap in such a position that the cut edge of the strap will lie in close proximity to the seal when the seal is applied to the strap ends.

In the operation of this improved apparatus, the strap stretching tool, having its magazine 65 filled with a stack of seals 60, is placed in position with its base plate resting on the upper surface or against a vertical side surface of the box or package to be strapped. The free end 27ᵃ of a strap is then passed beneath the gripping dog 30 which is elevated by pressing on the lever 30ᵈ. This end of the strap is located, as shown in Fig. 1, so that it extends beneath the shearing blade 154 and over the flange 25ᵇ of the base plate, the retaining member 55 being then elevated to permit the convenient insertion of the strap through the previous movement of the lever 45 to the extreme right-hand position shown in Fig. 1. The strap 27 is then passed around the package 26 and the supply portion 27ᵇ thereof is inserted beneath the gripping dog 35 and beneath the retaining member 55 and the gripping dog 47, all of which will have been elevated by the movement of the lever 45 to its extreme righthand position. This supply portion 27ᵇ of the strap is also extended through the slot 30ᶜ in the gripping dog 30. Then, upon the initial movement of the lever 45 toward the left, as viewed in Fig. 1, the supply portion 27ᵇ of the strap is automatically gripped by both of the gripping dogs 35 and 47 and the retaining member 55 is moved downwardly to retain both ends of the strap in overlapping alignment with respect to each other. The movement of the lever 45 toward the left is then continued to draw the strap taut around the package. If one movement of the lever is not sufficient, it may be returned toward its initial position and reciprocated several times in order to bring about the desired degree of tautness in the strap. Upon each return movement of the lever 45 toward the right, as viewed in Fig. 1, the gripping dog 35 will automatically elevate sufficiently to slide over the surface of the strap, due to the inclination of the gripping dog. But the gripping dog 47 will retain its hold upon the supply portion of the strap so that there will be no loss of tension while the lever 45 and the gripping dog 35 are making a return stroke. The strap will ordinarily have sufficient stiffness so that, on each stretching operation of the lever 45, a portion of the strap will be pushed along beneath the gripping dog 47 due to the inclination of this gripping dog. Having drawn the strap taut around the package, the lever 120 is then operated to cut off the supply portion of the strap and to apply a seal to the overlapping strap ends in the manner set forth above and as more fully described in said copending original application.

In Figs. 13 to 20, inclusive, there is shown a modification of the means for mounting and actuating the movable gripping dog 35, heretofore described, which is intended to permit a more ready release of the strap from the tool in case it be desired to do this without completing the formation of the interlocking joint, as, for example, when it is found after drawing the strap taut that it is not in the desired position on the package. Under such circumstances, the tension in the strap tends to hold the gripping dogs 35 and 47 down in their gripping positions and it is difficult to elevate them to release the strap. Means have therefore been provided for facilitating this release. In the drawings of this modification, the same reference numerals are used as were used heretofore to designate the parts which are the same in construction and the present description will be confined to the parts which are different.

In the modified form, the gripping dog 175, which corresponds in position and general function to the gripping dog 35 heretofore described, is provided with a serrated gripping surface 175ᵃ adapted to engage the supply portion 27ᵇ of the strap above the flange 28ᵃ of the movable block 28 and this gripping dog is mounted upon the eccentric portion 176ᵃ of a pin 176 which is in all respects similar to the pin 36 heretofore described except for this eccentric portion and some other details of the forward end thereof. The dog 175 is provided with an upwardly extending arm 175ᵇ and a coil spring 177 is mounted around the eccentric portion 176ᵃ of the pin with one end 177ᵃ thereof engaging one side of the arm 175ᵇ and with the other end 177ᵇ thereof hooked over a part 228ᵃ of the block 28 so that the spring tends normally to move the gripping dog into engagement with the strap. The part 228ᵃ is a portion of a rectangular hollow bracket which extends forwardly from the block 28 and within which the gripping dog 175 is located. The forward end of the pin 176 is provided with an axially concentric cylindrical portion 176ᵇ which is journaled in a bushing mounted in the front transverse member 228ᵇ of this bracket and, between the parts 176ᵃ and 176ᵇ, the pin is provided with a portion 176ᶜ of hexagonal cross section which fits within a corresponding aperture in the hub portion of a lever 178 arranged to extend upwardly adjacent the arm 175ᵇ of the gripping dog. The lever 178 has a latch member 179 pivoted upon the upper end thereof and this latch member has a flange 179ᵃ extending substantially parallel to the flange 178ᵃ which projects laterally from the upper end of the lever. A coil spring 180 is mounted between the flanges 178ᵃ and 179ᵃ so that the hook portion 179ᵇ of the latch member is normally held in interlocking engagement with the upper extremity of the arm 175ᵇ formed on the adjacent gripping dog. The arm 175ᵇ has an inclined face 175ᶜ adjacent its upper end so that when the lever 178 is moved toward the left from the position shown in Fig. 16, the latch member will automatically interlock with the arm of the detent in the manner shown in Fig. 13.

Assuming that the strap 27 is drawn taut around the package and that the supply end 27ᵇ of the strap is being held by the gripping dog 47, as shown in Fig. 13, it is first necessary to release the strap from this gripping dog and this is effected by first transferring the tension of the strap to the other gripping dog 175 and then finally releasing the latter dog from the strap. To do this the lever 45 is moved from the position shown in Fig. 13 to the position shown by full lines in Fig. 15, thus permitting the dog 175, which is then latched to the lever 178, to move into engagement with the strap under the influence of the spring 177. Then, upon further movement of the lever 45 in the same direction to the position shown by dotted lines in Fig. 15, the tension in the strap is taken by the dog 175 and the pin 50 which controls the dog 47 is still engaged by the pin 51, so that the endwise thrust on the portion of the strap between the dogs 175 and the dog 47, coupled with the action of the spring 49 associated with the dog 47, operates to raise the dog 47 out of engagement with the strap. The operator then presses on the flange 179ᵃ of the latch member to release the lever 178 from the arm 175ᵇ of the dog 175, whereupon continued downward pressure on the flange 179ᵃ operates the lever 178 to rotate the pin 176 and thereby cause the eccentric portion 176ᵃ to raise the dog 175 out of engagement with the strap. To limit and adjust the movement of the dog 175 toward the flange 28ᵃ of the block, a stud 181 is adjustably mounted in the part 228ᵃ of the block to engage the lower end face of the dog, as shown in Fig. 15, and this stud may be held in adjusted position by a lock nut 182.

Although one form of the invention and a modification thereof have been shown and described by way of illustration, it will be understood that it may be constructed in various other embodiments coming within the scope of the appended claims.

We claim:

1. The combination in strap stretching apparatus, of a base plate, a bar movable on said base plate, means including a hollow shaft for effecting movement of said bar, a pin mounted within said hollow shaft, a gripping dog mounted on said pin, and means actuated by a predetermined rotation of said shaft for actuating said pin to effect angular movement of said gripping dog.

2. The combination in strap stretching apparatus, of a base plate, a bar movable on said base plate, a block carried by said bar and having a flange adapted to support a strap, a hollow shaft journaled in said block, a pin mounted in said shaft, a gripping dog mounted on said pin and adapted to engage said strap on said flange, means for rotating said shaft, and means actuated after a predetermined rotation of said shaft in one direction for effecting angular movement of said pin to release said gripping dog from said strap.

3. The combination in strap stretching apparatus, of a base plate, a bar slidable on said base plate, a block carried by said bar and having a flange on which a strap is adapted to rest, a hollow shaft journaled in said block, a pin mounted in said shaft, a gripping dog mounted on said pin, a spring tending normally to move said gripping dog into engagement with said strap, means for rotating said shaft, and means actuated upon a predetermined rotation of said shaft in one direction to turn said pin and thereby move said gripping dog out of engagement with said strap.

4. The combination in strap stretching apparatus, of a base plate having a flange adapted to support a strap, a gripping dog pivotally mounted on said base plate and adapted to engage the upper side of said strap, said gripping dog having a socket, a pin engaging said socket, and means for actuating said pin to release said gripping dog from said strap.

5. The combination in strap stretching apparatus, of a base plate having a flange adapted to support a strap, a gripping dog mounted on said base plate and adapted to engage the strap on the side thereof opposite said flange, a spring tending normally to move said gripping dog into engagement with said strap, a pivotally mounted pin engaging said gripping dog, and means for rocking said pin about its pivot for moving said gripping dog out of engagement with said strap.

6. The combination in strap stretching apparatus, of a base plate having a flange adapted to support a strap, a gripping dog mounted on said base plate and adapted to engage the strap on the side thereof opposite said flange, a spring tending normally to move said gripping dog into engagement with said strap, a pivotally mounted pin engaging said gripping dog, a bar slidable on said base plate, and means actuated by said bar for moving said pin to cause said gripping dog to release said strap.

7. The combination in strap stretching apparatus, of a base plate having a flange adapted to support a strap, a gripping dog mounted on said base plate and adapted to engage the strap on the side thereof opposite said flange, a spring tending normally to move said gripping dog into engagement with said strap, a pivotally mounted pin engaging said gripping dog, a bar slidable on said base plate, and a resiliently mounted member carried by said bar for engaging said pin upon movement of said bar and thereby causing said gripping dog to release said strap.

8. The combination in strap stretching apparatus, of a base plate, a pair of relatively movable gripping devices carried by said base plate for holding a strap with its ends overlapping, means including a sliding bar for effecting relative movement of said gripping devices to draw the strap taut, a retaining member extending transversely of said strap ends and adapted to maintain said ends in overlapping relation, means tending normally to move said retaining member to its operative position, and means including a cam carried by said bar operated by a predetermined movement of said bar after the strap has been drawn taut for actuating said retaining member to release said strap ends therefrom.

9. The combination in strap stretching apparatus, of a base plate, a bar slidable on said base plate, a block carried by said bar and having a flange on which a strap is adapted to rest, a hollow shaft journaled in said block, a pin mounted in said shaft, a gripping dog mounted on said pin, a spring tending normally to move said gripping dog into engagement with said strap, means for rotating said shaft, means actuated upon a predetermined rotation of said shaft in one direction to turn said pin and thereby move said gripping dog out of engagement with said strap, said pin having an eccentric portion upon which said gripping dog is mounted; means normally causing said pin and said gripping dog to move together, and means for releasing said last-named means to permit said gripping dog to be turned about said eccentric portion.

10. The combination in strap stretching apparatus, of a base plate, a bar slidable on said base plate, a block carried by said bar and having a flange on which a strap is adapted to rest, a hollow shaft journaled in said block, a pin mounted in said shaft, a gripping dog mounted on said pin, a spring tending normally to move said gripping dog into engagement with said strap, means for rotating said shaft, means actuated upon a predetermined rotation of said shaft in one direction to turn said pin and thereby move said gripping dog out of engagement with said strap, said pin having an eccentric portion upon which said gripping dog is mounted, a lever fixed in said pin adjacent said gripping dog, a latch member normally securing said lever to said gripping dog, and means for releasing said latch member and permitting said lever to turn said pin and thereby cause said eccentric portion to elevate said gripping dog.

WILLIAM C. CHILDRESS.
JAMES M. ROYAL.

REFERENCES CITED

The following references are of record in the file of this patent:

UNITED STATES PATENTS

| Number | Name | Date |
| --- | --- | --- |
| 1,784,025 | Norton | Dec. 9, 1930 |
| 1,891,767 | Ketcham | Dec. 20, 1932 |
| 1,939,746 | Whitman | Dec. 19, 1933 |
| 1,988,534 | Abbott | Jan. 22, 1935 |
| 1,988,730 | Harvey | Jan. 22, 1935 |
| 1,989,669 | Harvey | Feb. 5, 1935 |
| 2,087,655 | Prestwich | July 20, 1937 |
| 2,229,786 | Abbott | Jan. 28, 1941 |
| 2,324,609 | Watt | July 20, 1943 |